United States Patent [19]

Crotti

[11] 4,439,324

[45] Mar. 27, 1984

[54] REMOVAL OF OIL FROM WATER

[76] Inventor: Alfred F. Crotti, 5, Deanery St., London, W1Y 5LH, England

[21] Appl. No.: 389,760

[22] Filed: Jun. 18, 1982

Related U.S. Application Data

[63] Continuation of Ser. No. 194,976, Oct. 8, 1980, abandoned.

[30] Foreign Application Priority Data

Oct. 10, 1979 [GB] United Kingdom ................ 7935253
Mar. 11, 1980 [GB] United Kingdom ................ 8008198

[51] Int. Cl.³ ............................................ E02B 15/04
[52] U.S. Cl. .................................... 210/691; 210/924
[58] Field of Search .................... 5/434; 210/671, 680, 210/691, 242.4, 924

[56] References Cited

U.S. PATENT DOCUMENTS 1,201,554 10/1916 Burton ................................ 5/434
3,739,913 6/1973 Bogosian ........................ 210/242.4

OTHER PUBLICATIONS

Sittig, M., Oil Spill Prevention and Removal Handbook, Noyes Data Corp., 1974, p. 392.
"Pouring Feathers on Oily Waters", Evening Standard, London, U.K., Apr. 10, 1978, p. 11.

*Primary Examiner*—Ivars C. Cintins
*Attorney, Agent, or Firm*—Maky, Renner, Otto & Boisselle

[57] ABSTRACT

Bags loosely containing feathers are distributed onto oil on water to enable the feathers to take up the oil. The bags have openings sufficiently large to permit the oil to enter and contact the feathers within the bags. The bags can be linked together, for example in a chain using ropes. Once the feathers have become saturated with oil the bags can be picked up from the water.

8 Claims, 3 Drawing Figures

REMOVAL OF OIL FROM WATER

This is a continuation, of application Ser. No. 194,976, filed Oct. 8, 1980, now abandoned.

This invention relates to the removal of oil from water.

In recent years, the problem of dealing with oil on water, for example as the result of spillage from tankers or of the blow-out of an offshore oil well, has become of increasing concern. Various approaches have been adopted to combat the problem, including the use of detergents and of skimmer devices to pick up the oil from the surface of the water. However detergents are costly and present pollution hazards themselves. Skimmer devices are usually complex, require considerable capital investment to manufacture and engineering and maintenance to keep fully operational, and in general only operate fully satisfactorily in calm conditions.

U.K. Specification No. 2,020,265 A describes an alternative approach to dealing with oil spilt on water involving the use of feathers to take up the oil. The specification envisages distributing feathers onto the oil. This method is also proposed in Oil Spill Prevention and Removal Handbook, M. Sittig, Noyes Data Corp., 1974, p.392 and in an article published in the "Evening Standard" newspaper, London, United Kingdom on Apr. 10, 1978. However, the suggested technique of using feathers is impracticable in even mild weather conditions. It is difficult to off-load the feathers accurately onto the oil. It was found that the feathers tend simply to blow over and off the oil, picking up little if any of it. U.K. Specification No. 2,020,265 A also describes the use of feathers compressed into packages which are dropped onto oil. However, this has several disadvantages. It is difficult for the oil to penetrate into the interior of the packages. It inevitably takes some time for the oil to contact the inner feathers, and in the meantime the feathers will have become sodden with water. Consequently their effectiveness in picking up the oil will be reduced.

U.S. Pat. No. 3,739,913 discloses an open-mesh container for collecting oil from the surface of open water. The container is packed with an oil-absorbing material, in particular a mixture of glass fibre and reclaimed tire cord. Again, it is difficult for oil to reach the interior of the containers. A further disadvantage is that oil leaks from the absorbing material once the container has been removed from the water. The containers also require a flotation material to ensure that they do not ride too low in the water.

It has now been found that the problems mentioned above can be overcome by removing oil from water by a method which comprises applying to water to be treated at least one bag loosely containing bird feathers, the or each bag having openings sufficiently large to permit oil to contact the feathers yet sufficiently small to retain the feathers within the bag, and allowing the feathers to take up the oil. At present, the exact process by which feathers attract and pick up oil, be it absorption or adsorption, is not sufficiently understood, and for convenience will be referred to herein as "taking up".

The use of bags loosely containing feathers can greatly improve the efficiency with which oil may be removed from water. Individual bags are sufficiently heavy not to be blown up into the air off the surface of the oil without affording the feathers an opportunity to contact the oil. Further, it has been found that for ease of operation the bags may be linked together and distributed on the surface of the oil slick.

The present invention further provides a bag for removing oil from water, the bag loosely containing bird feathers and having openings sufficiently large to permit oil to enter the bag and contact the feathers yet sufficiently small to retain the feathers within the bag. Preferably, two or more such bags may be linked together.

In the description which follows, reference will be made by way of example to the accompanying drawings in which.

The bags of the present invention are loosely packed with bird feathers. Advantageously, washed and dried chicken or turkey feathers may be employed. Preferably, the feathers are breast, down or marabou feathers. Washed and dried curled chicken feathers in particular hen bird feathers are most preferred.

The exact quantity of feathers in each bag is variable but should be less than sufficient to fill the bag and be such that the feathers can shift and mix within the bag so that they can all become coated with oil. The feathers should not be so numerous as to be stuffed or compressed in the bag. The bag should have at least some flexibility and not so stuffed with feathers as to retain their shape when placed on the oil on the water. Preferably, from about one third to three quarters, more preferably from one third to two thirds of the volume of a bag is occupied by feathers in their normal uncompressed state when the bag is held at one end and the feathers have settled within the bag.

Figure 1:
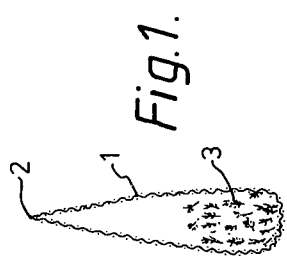
FIG. 1 is a cross-section through one embodiment of a bag according to the invention.

An example of the relationship between the volume of a bag and the feathers it contains is shown in FIG. 1. In this Figure a bag 1 hangs from means (not shown) holding the top end 2 of the bag. The feathers 3 which have settled at the bottom of the bag are in their normal uncompressed state. The feathers occupy approximately one half of the volume of the bag.

Each bag of loosely packed feathers preferably has a "tea bag" configuration, that is an approximately rectangular shape to permit a large surface area of feathers to be in contact with the oil. Alternatively the bag may be sausage-shaped. Preferably the bags are made of a mesh material. The mesh material may be non-woven or woven material which may be synthetic fibre, such as nylon, or natural fibre. The size of the openings in each bag will depend on the size of feathers to be enclosed. Nevertheless, the openings in each bag must be sufficiently large to permit oil to contact the feathers contained in the bag yet sufficiently small to retain the feathers within the bag. Typically, the maximum dimensions of each opening may be from about $1.5 \times 10^{-3}$ m (1.5 mm) to $3.0 \times 10^{-3}$ m (3.0 mm). The bag may be $4.57 \times 10^{-1}$ m (1½ feet) square and contain up to $3.5 \times 10^{-1}$ kg (350 g) of feathers. The dimensions of the bag can be varied to suit different conditions of use. For example for large oil slicks, bigger bags may be used. For coastal waters near to the shore or in harbour use in difficult areas to reach smaller bags may be used. The feathers can be dyed to enable the ready identification of the bags when off loaded onto an oil slick.

The bags may be applied individually or linked together. In the latter case, they are preferably connected in a chain, in groups of any number. For example, a chain of 5, 50 or more linked bags can be employed. The bags can be linked together in any suitable manner using, for example, hook, tie or clip means. Thus ropes or chains can be employed to link the bags to each other.

Figure 3:
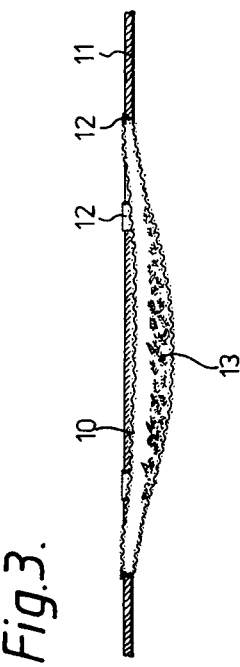
FIG. 3 is a cross-section through one of the bags of FIG. 2.
Figure 2:
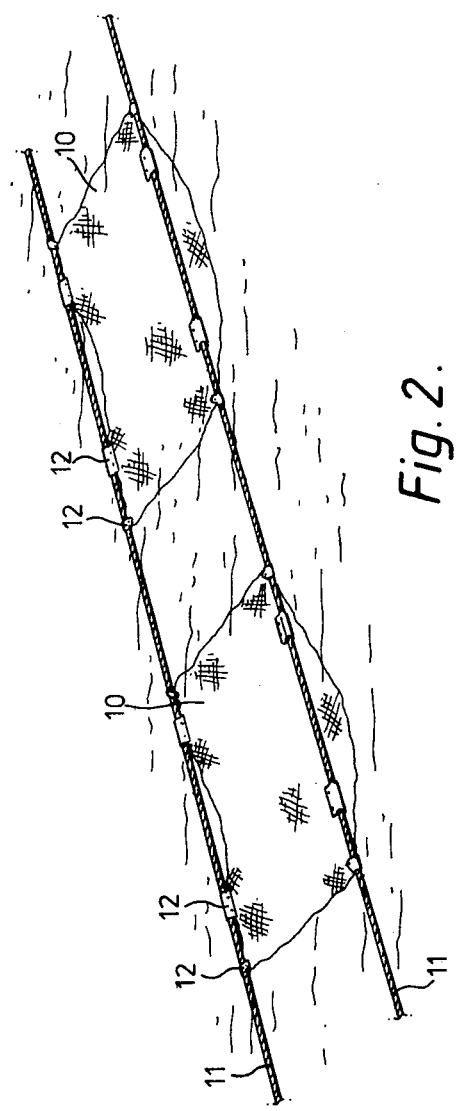
FIG. 2 is a perspective view of an embodiment of two bags in accordance with the present invention linked together and floating on the surface of an oil slick.

An embodiment in which bags are linked together by ropes is illustrated in FIGS. 2 and 3. In these Figures, bags 10 of mesh material are attached spaced apart along two runs 11 of rope by clip means 12. Each bag 10 is made of mesh material, thus enabling oil on the surface of the water on which the bags are distributed to contact the feathers 13 within each bag.

A variety of techniques can be employed to construct the bags. When constructed of a thermoplastic material, the open side or sides of bags appropriately partly filled with feathers can be sealed by the application of heat and/or pressure. Alternatively, the open ends may be stitched closed. A chain of linked bags may be manufacture, for example, by feeding a strip or two strips of mesh material through apparatus comprising means to seal together an appropriate part or parts of the strip(s) so as to form pockets open along at least a portion of one side thereof, means for packing feathers loosely in the pockets through the open portion of one side of the pockets and means for sealing said open portion of the thus-packed pockets. If bags are produced individually and it is desired to link the bags together, each bag may be provided with means to link it to another bag. Chains of bags can be broken into small lengths or can be joined to form longer chains. Chains may be arranged side by side and connected together. The length of the chain that is used in any particular instance will depend on several factors including the kind and size of an oil spill, weather conditions and location.

The bags can be packed into containers prior to use. For example, chains of bags can be folded accordion-like and packed under high pressure in a container. In this way from 6 to 8 tons or more of purified chicken feathers can be packed in a standard 40 foot container.

The bags of loose feathers are applied to water to be treated to allow the feathers to take up the oil. The bags may be distributed by any suitable means, for example from a helicopter, aeroplane or boat. Alternatively, linked bags can be towed by a boat through oil or they may be pulled through a slick between two boats, one boat off-loading mesh bags onto the oil whilst the other boat pulls in oil-laden bags. The bags can be off-loaded directly onto the oil or in the estimated path of drift of the oil, although in the latter case this must be done with caution because when the feathers are wet they lose some of their efficiency in taking up oil.

It is possible to employ the method of the invention on oil slicks both on salt water and fresh water. Consequently, it can be employed to deal with oil spillages on inland waters, in harbours where tankers are loaded and unloaded, and out at sea. It is possible to calculate approximately the quantity of feathers that are needed to combat a particular oil slick by first estimating the weight of oil to be picked up and then applying feathers in an amount of 1/14th to 1/20th by weight of the estimated weight of the oil. More or less can be used as desired.

Once the bags have been distributed, the feathers within each bag can slowly take up the oil with which they are in contact without further agitation. However, both the wind and the movement of the sea can help by tossing each bag about and thereby more quickly exposing all the feathers in the bag to contact with oil. Thus unlike other methods of treating oil slicks rougher conditions are beneficial. The feathers become saturated with oil after a comparatively short space of time, in some cases even within a few minutes. This will depend on, for example, the nature of the oil slick and the weather conditions.

The oil saturated feathers can easily be removed from the water. The bags can be lifted out of the sea using nets. The feathers retain the oil while the water drains from the bags. It is then possible to reclaim the oil taken up by the feathers if desired. Generally, the oil-laden bags will float. Alternatively, the bags may be sunk, if desired, by means of weights in or attached to the bags.

The use of bags containing loose feathers can result in significantly high weight ratios of oil to feathers being recovered in short intervals of time. A variety of oils have been successfully removed from water in tests, including Argyll crude, Kuwait crude, North Sea crude, diesel oil, petroleum and mixtures of fuel and diesel oil.

Bags of loose feathers can be used to take up oil which is in the form of "mousse". When crude oil or fuel oil or mixtures of fuel and boiler oil is spilled, for example, on the surface of the sea, the consistency of the oil passes through various stages. When the oil is first spilled on the surface, the more volatile fractions of it begin to evaporate thus causing some increase in the viscosity of the oil remaining on the sea. Depending on weather conditions this oil begins to emulsify with the sea water. If conditions are more turbulent, the sea water mixes with the oil and forms emulsions increasing in the amount of water. It is difficult to plot the time over which this occurs because it depends very much on conditions, but this can take place anywhere from four hours to 24 hours. The consistency of the water-oil emulsion becomes somewhat creamy, hence the name "mousse." The mousse can form as a continuous layer on the sea or in time can fragment into lumps of varying sizes. Bags for use in picking up "mousse" need to be very loosely filled with feathers. The content of feathers in the bags should be at the lower end of the preferred ranges stated above, or less. It appears that the "mousse" adheres to the feathers and is taken up in this way.

We claim:

1. A method of removing oil from water, which method comprises the steps of applying to water to be treated at least one bag loosely containing washed and dried chicken or turkey feathers, the or each bag having means defining openings sufficiently large to permit oil to contact the feathers yet sufficiently small to retain feathers within the bag, and allowing feathers to take up the oil.

2. A method according to claim 1 which further comprises the step of picking up the or each bag of oil-laden feathers from the water.

3. A method according to claim 1 wherein the or each bag is made of mesh material.

4. A method according to claim 1 wherein from one third to three quarters of the volume of the or each bag is occupied by feathers in their normal uncompressed state when the bag is held at one end and the feathers have settled within the bag.

5. A method according to claim 1 wherein the or each bag is selected from the group consisting of a bag with a rectangular "tea bag" configuration and a sausage-shaped bag.

6. A method according to claim 1 wherein individual bags are applied to water to be treated.

7. A method according to claim 1 wherein two or more bags linked together are applied to water to be treated.

8. A method according to claim 7 wherein the bags are linked in a chain.

* * * * *